US005245233A

United States Patent [19]

Sudler

[11] Patent Number: 5,245,233

[45] Date of Patent: Sep. 14, 1993

[54] ELECTRIC STEPPING MOTOR FOR TWO DIRECTIONS OF ROTATION

[75] Inventor: Roland Sudler, Frankfurt am Main, Fed. Rep. of Germany

[73] Assignee: VDO Adolf Schindling, Frankfurt, Fed. Rep. of Germany

[21] Appl. No.: 866,312

[22] Filed: Apr. 9, 1992

[30] Foreign Application Priority Data

Jun. 5, 1991 [DE] Fed. Rep. of Germany ....... 4118374

[51] Int. Cl.[5] .......... H02K 37/10

[52] U.S. Cl. .......... 310/49 R; 310/156; 310/254

[58] Field of Search .......... 310/49 R, 156, 254, 310/184, 185

[56] References Cited

U.S. PATENT DOCUMENTS 4,831,293 5/1989 Krop .......... 310/49 R
4,973,867 11/1990 Sudler .......... 310/49 R

FOREIGN PATENT DOCUMENTS 3828464 8/1988 Fed. Rep. of Germany .

*Primary Examiner*—Steven L. Stephan
*Assistant Examiner*—Judson H. Jones
*Attorney, Agent, or Firm*—Martin A. Farber

[57] ABSTRACT

An electromagnetic stepping motor for two directions of rotation has a stator (1), a rotor (6) and a housing (23). Four half-coils (2) with iron cores (4) are arranged equidistant from and with their axes parallel to the rotor axis (3) and perpendicularly to a return bridge (5). Each half-coil (2) is wound in the direction opposite the half-coils (2) lying opposite it. The iron cores (4) are connected magnetically to each other by a pole-shoe spider (8) at their ends which lie opposite the return bridge (5). The permanent magnet (7) of the rotor (6) is arranged within a central bore hole (9) of the pole-shoe spider (8), with the formation of an air gap.

14 Claims, 2 Drawing Sheets

4
2
10
6
9
2
10
10
4
4
11
12
4
2
8
10
14
2
4
20
5

6
24
13
7
8
13
4
17
4
18
19
1
2
14
3
15
16
2
5

ELECTRIC STEPPING MOTOR FOR TWO DIRECTIONS OF ROTATION

FIELD AND BACKGROUND OF THE INVENTION

The present invention relates to an electromagnetic stepping motor for two directions of rotation, consisting essentially of a) a stator (1) having four half-coils (2) with iron cores (4), the half-coils being arranged symmetrically with respect to a rotor shaft (3) wherein every two opposite ones of the half-coils are electrically connected to each other and form a coil controlled to produce magnetic fields in the same direction, the stator having a return bridge (5) which magnetically connects the iron cores (4) to each other;

b) a rotor (6) which is rotatably mounted in the stator (1) and has a two-pole or six-pole permanent magnet assembly (7); as well as c) a housing (23) enclosing the stator and the rotor.

Stepping motors for two directions of rotation are frequently developed with an iron-free cross-coil winding as shown in Federal Republic of Germany OS 38 28 464, in which the magnet, which is connected, fixed for rotation with the rotor, lies completely within the coil. These stepping motors have the advantage that a purely sinusoidal torque can be produced with them, as is important for action in a microstep process.

There is the disadvantage, however, that the nature of the winding requires a certain minimum structural height, so that an extremely flat construction cannot be realized, or can be realized only with considerable limitations.

A stepping motor which is of a basically different manner of construction is disclosed in German Patent 30 26 004. In that case, two coils are wound on a stator having pole shoes the axes of which are arranged in the plane of the stator at an angle of about 120° to each other. A total of three pole shoes are provided which are separated from each other by air gaps and surround the two-pole magnet of the rotor. Such stepping motors enable a substantially flatter construction but they have a very high pole sensitivity, i.e. only providing a torque which insufficiently approximates sinusoidal shape, wherein differences from sinusoidal shape must be individually taken into account for control in the microstep process.

Stepping motors are also known (Federal Republic of Germany OS 39 18 538) in which a stator 4 has inward facing pole shoes on which four half-coils are arranged. In this case, there must be a sufficiently large free space in the center of the stator in order that the coils can be pushed or wound on the pole shoes. This necessarily means a rotor of relatively large diameter and correspondingly low start-stop frequency. Furthermore, there is extensive pole sensitivity due to the gaps between the pole shoes.

SUMMARY OF THE INVENTION

It is an object of the invention to provide a stepping motor of the aforementioned type which does not have the above-mentioned disadvantages, i.e., which is not pole-sensitive and which combines the ideal sinusoidal course of the torque of an iron-free cross-coil winding with the flat manner of construction of the iron-containing coils wound on a common stator, and wherein the stepping motor can be produced at reasonable expense and with properties which are readily reproducible.

According to the invention, the electromagnetic stepping motor comprises (a) iron cores (4) arranged equidistant from and parallel to the rotor axis (3) with axes perpendicular to a return bridge (5);

(b) wherein each half-coil (2) is wound in the direction opposite to the half-coil (2) opposite it;

(c) wherein the iron cores (4) are connected magnetically to each other by a pole-shoe spider (8) located at their ends lying opposite the return bridge (5); and (d) wherein a permanent magnet (7) of the rotor (6) is arranged, with the formation of an air gap, within a central bore hole (9) of the pole-shoe spider (8).

Such stepping motors permit a very flat construction without disturbing pole sensitivity. By the provision of the pole-shoe spider, the magnetic lines of flux are bundled excellently and conducted up into the immediate vicinity of the rotor magnet. In this way, excellent coupling is obtained, as well as a surprisingly accurate sinusoidal course of the torque. The rotor magnet can be kept very small, which is advantageous for a relatively high start-stop frequency of the motor. The torque, which is thereby necessarily comparatively small, can be compensated excellently by gearing which is in any event necessary or customary in most cases of use. It is important that the pole-shoe spider (8) be developed as a single piece in such a manner that the four arms (10) are connected to each other in a crossing region by narrow, precisely dimensioned fingers (11, 12) after the central bore hole (9) has been produced.

According to a feature of the invention, the iron cores (4) are connected to the return bridge (5) by rivets.

Further, it is a feature of the invention that the pole-shoe spider (8) is connected to the iron cores (4) by rivets.

Another feature of the invention provides that the half-coils (2) are arranged on plastic winding forms (13) which are placed on the iron cores (4).

The invention also provides that the return bridge (5) is covered on the coil side by a plastic plate (14).

In accordance with still another feature of the invention, a plastic plate (14) and a winding form (13) are formed as a composite structural part.

Also the invention provides that the winding form (13) be clipped into the plastic plate (14).

Furthermore, the plastic plate (14) is developed in one piece, with at least two winding forms (13).

Yet by virtue of the invention, the plastic plate (14) with the return bridge (5) are connected to each other by forcing projections (15) of the plastic plate (14) into bore holes (16) in the return bridge (5).

Moreover, the rotor shaft (17) is mounted in the bore hole (18) of a central projection (19) of the plastic plate (14).

In accordance with another feature of the invention, connecting pins (20) are inserted into bore holes (21) of decentrally arranged projections (22) of the plastic plate (14).

Still further according to the invention, the stator and rotor are surrounded by a flat-cylindrical housing (23), the connecting pins (20) protruding from one or both end surfaces.

BRIEF DESCRIPTION OF THE DRAWINGS

With the above and other objects and advantages in view, the present invention will become more clearly understood in connection with the detailed description of the preferred embodiment, when considered with the accompanying drawings, of which.

DETAILED DESCRIPTION OF THE PREFERRED EMBODIMENT

Figure 1:
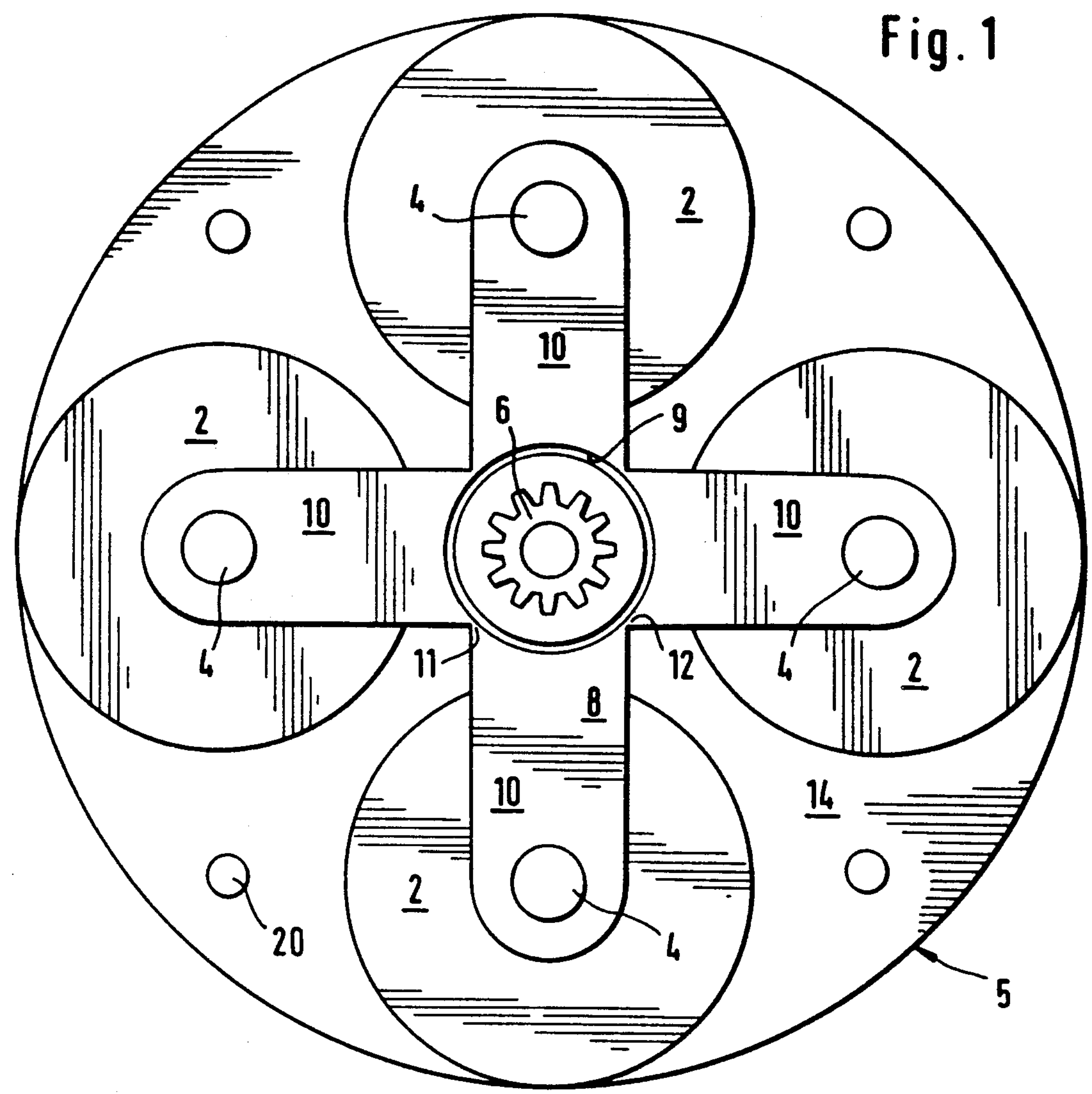
FIG. 1 shows an embodiment of the stepping motor in top view.

In FIG. 1, four half-coils 2 with iron cores 4 are arranged on a return bridge 5 which is covered by a plastic plate 14, the half-coils 2 being connected magnetically by a pole-shoe spider 8. Furthermore, four connecting pins 20 are provided, to which the ends of the coil windings on the one hand and cables for control of the stepping motor on the other hand are connected. The pole-shoe spider 8 has four arms 10, which, after the central hole 9 has been produced in a crossing region, are connected to each other by narrow, precisely dimensioned fingers 11, 12. The rotor 6 is arranged rotatably within the central bore hole 9 of the pole-shoe spider 10.

Figure 2:
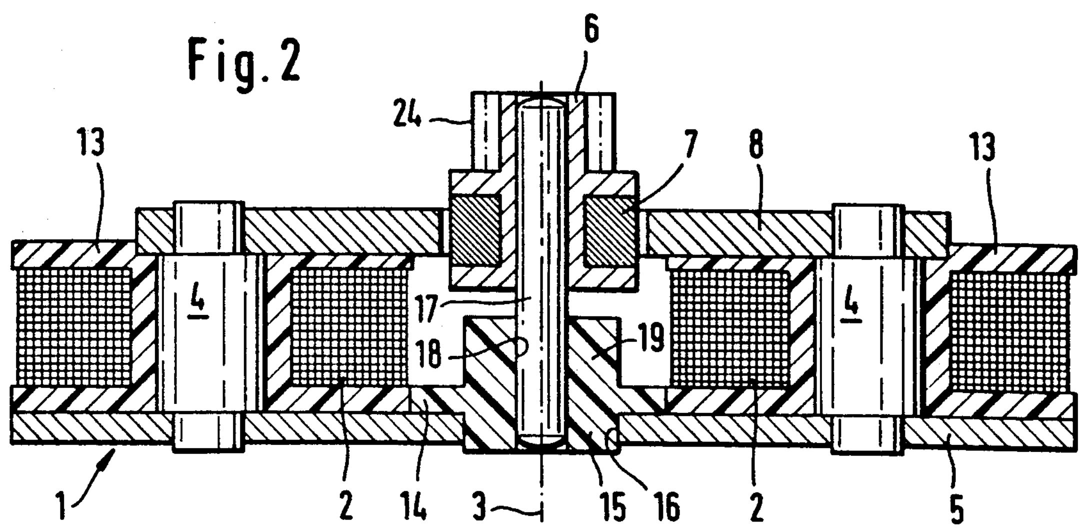
FIG. 2 shows the same embodiment in cross section.

From the sectional view of FIG. 2, it can be seen how the cores 4 of the half-coils 2 are anchored, on the one hand, in the return bridge 5 of the stator 1 and, on the other hand, in the pole-shoe spider 8. The half-coils 2 are arranged on winding forms 13 of plastic which, in their turn, are placed on the iron cores 4 and, together with the plastic plate 14, form a complete covering of the return bridge 5. The plastic plate 14 can be developed in a single piece with the winding forms 13. As an alternative, the plastic plate 14 and the winding forms 13 can also be developed as a composite structural part, or the plastic plate 14 can be developed as one piece with only two winding forms 13.

The plastic plate 14 is pressed by means of a projection 15 into a central bore hole 16 in the return bridge 5. The plate 14 furthermore has a projection 19 and a bore hole 18 in which the rotor shaft 17 is rotatably mounted. The rotor 6 with two-pole permanent magnet 7 and pinion 24 is arranged, fixed for rotation, on the rotor shaft 17. As an alternative, the rotor shaft 17 can also be forced, fixed for rotation, into the bore hole 18 and the rotor 6 be rotatably mounted on the rotor shaft 17. Axial centering of the two-pole permanent magnet 7 is effected in this case via the pole-shoe spider 8.

Figure 3:
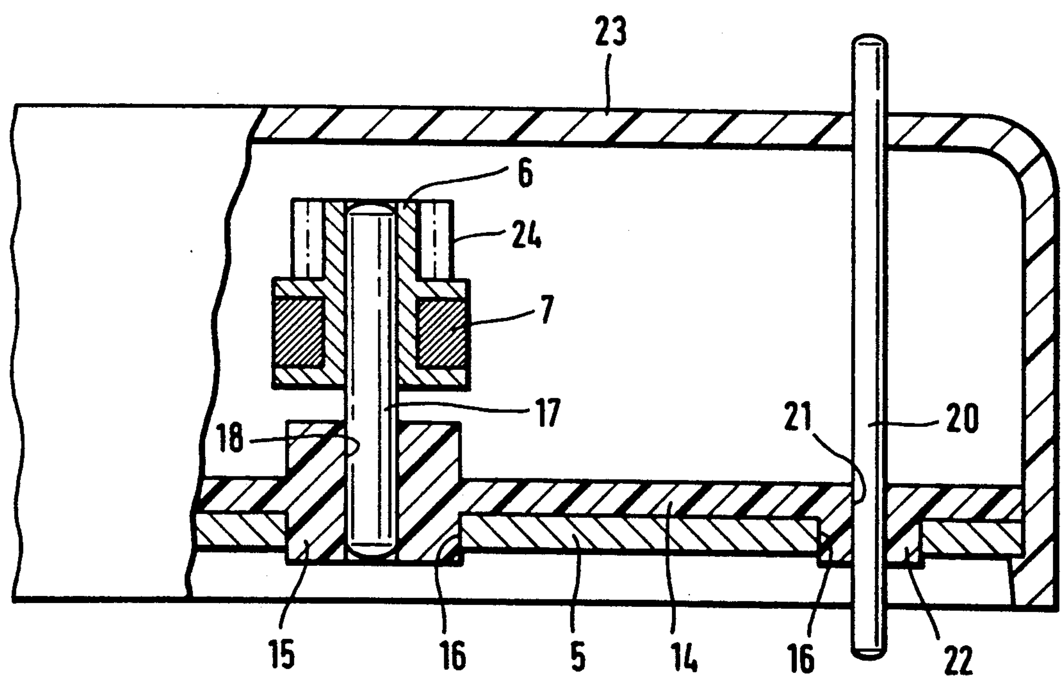
FIG. 3 shows a partial section with housing.

FIG. 3 again shows a partial section with housing 23. The return bridge 5 is again covered by a plastic plate 14, projections 15, 22 of which are forced into bore holes 16 in the return bridge 5. The projections 15, 22, in their turn, have bore holes 18, 21 into which the rotor shaft 17 and the connecting pins 20 are inserted. The pins 20 protrude outward both through the return bridge 5 and through the housing 23, thus permitting connection of the electric cables for the control of the motor. The rotor 6 with permanent magnet 7 and pinion 24 is arranged on the rotor shaft 17.

I claim:

1. An electromagnetic stepping motor for two directions of rotation, comprising;

a rotor shaft, and a stator having four half-coils with iron cores wherein a half-coil with core serves as a magnet, the four half-coils being arranged symmetrically about the rotor shaft with opposed pairs of the half-coils being electrically connected to each other to form a composite coil with a common direction of magnetization;

a return bridge which magnetically interconnects the iron cores to each other;

a rotor disposed on the rotor shaft and rotatably mounted in the stator, the rotor having a two pole or a six-pole permanent magnet assembly;

a housing enclosing the stator and the rotor;

wherein the iron cores are arranged equidistant from and parallel to the rotor axis;

the iron cores are mounted on and are oriented perpendicularly to the return bridge;

each half-coil is wound in a direction opposite to the other half-coil in each pair of opposed half-coils;

a pole shoe spider extending parallel to and spaced apart from the bridge, the iron cores being mounted to the spider with one end of each magnet contacting the spider and an opposite end of each magnet contacting said bridge, the iron cores being connected magnetically to each other by the pole-shoe the permanent magnet assembly of the rotor is positioned within a central bore hole of the pole-shoe spider, and is encircled by an air gap.

2. A motor according to claim 1, wherein the pole-shoe spider is formed as a unitary structure including four arms connected to each other at a crossing region by fingers at the central bore hole, the fingers being narrower than the arms.

3. A motor according to claim 2, wherein the iron cores are connected to the return bridge by rivets.

4. A motor according to claim 1, wherein the iron cores are connected to the return bridge by rivets.

5. A motor according to claim 1, wherein the pole-shoe spider is connected to the iron cores by rivets.

6. A motor according to claim 5, further comprising plastic winding forms disposed on the iron cores, the half-coils being arranged on the plastic winding forms.

7. A motor according to claim 6, further comprising a plastic plate; and wherein the return bridge is covered on its coil side by the plastic plate.

8. A motor according to claim 7, wherein the plastic plate and the winding form are formed as a composite structural part.

9. A motor according to claim 8, wherein the winding forms are clipped into plastic plate.

10. A motor according to claim 9, wherein the plastic plate is developed integrally with at least two of said winding forms.

11. A motor according to claim 7, wherein the plastic plate and the return bridge are connected to each other by means of projections of the plastic plate disposed in bore holes of the return bridge.

12. A motor according to claim 7, wherein the plastic plate has a central projection; and the rotor shaft is mounted in a bore hole of the central projection of the plastic plate.

13. A motor according to claim 7, wherein the plastic plate has projections distant from a center of the plastic plate; and the connecting pins are inserted into bore holes of the projections of the plastic plate.

14. A motor according to claim 13, wherein the housing is a flat cylindrical housing; and the connecting pins protrude from surfaces of either or both of the housing and the plastic plate.

* * * * *